Patented Sept. 27, 1938

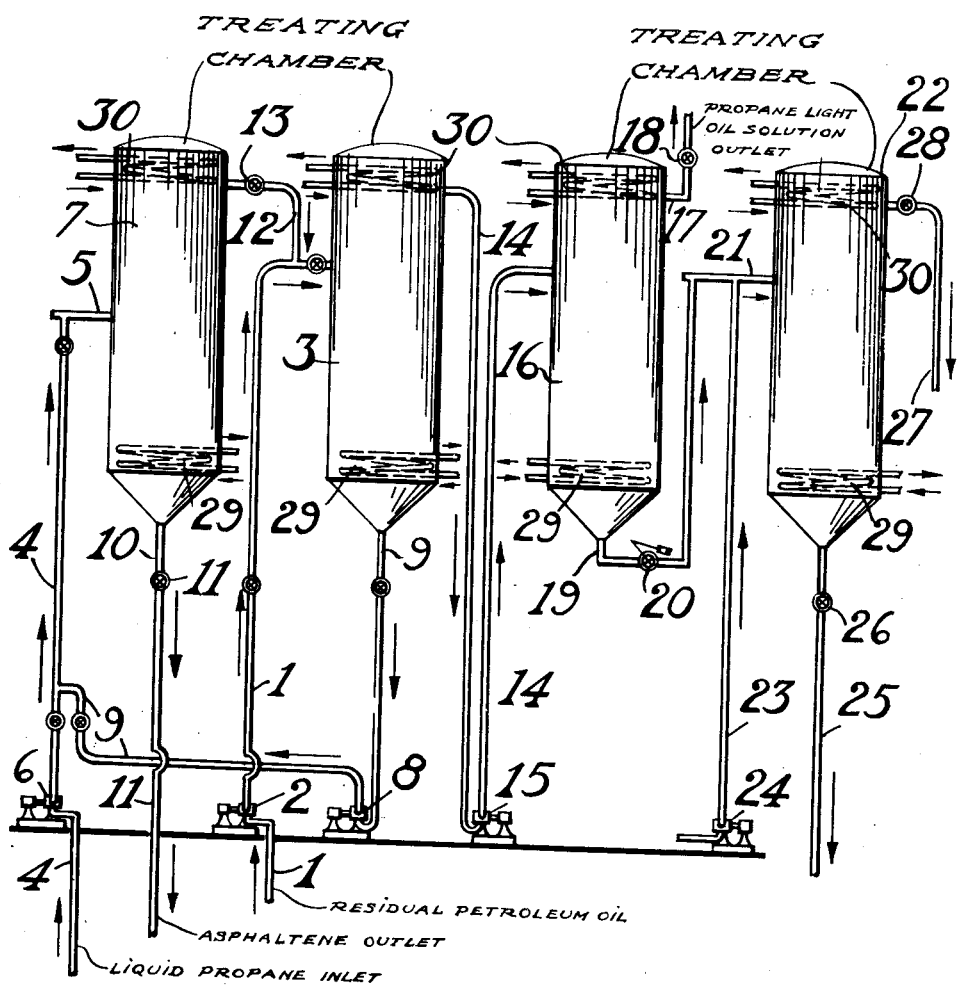

2,131,205

UNITED STATES PATENT OFFICE 2,131,205

METHOD OF MODIFYING PROPERTIES OF ASPHALTS

Alfred A. Wells, Roselle Park, and John O. Collins, Cranford, N. J., assignors to Standard Oil Development Company, a corporation of Delaware Application April 5, 1935, Serial No. 14,760

8 Claims. (Cl. 196—13)

This invention relates to a method of preparing asphalts whereby the physical properties may be largely modified.

It is well known that asphalts prepared from certain crude oils have properties which make them suitable for certain technical uses, such as pavements, roofing materials, etc. The asphalts produced from other crude oils do not lend themselves to these uses and while in certain circumstances it is possible to modify the properties to a slight extent by oxidation thereby raising the softening points, this modification is not sufficient so that one asphalt prepared from one crude oil will have similar physical properties to an asphalt prepared from another crude oil. Other methods of modifying properties of asphalts have been described in patent application Serial No. 631,369 filed September 1, 1932 by Alfred A. Wells, of which this application is a continuation in part. In that application, residual oils were distilled further to produce an asphalt and a heavy oil distillate, the distillate was extracted with a preferential solvent such as phenol, sulfur dioxide etc., the extract mixed with the asphalt and the mixture used as such or oxidized.

This difference between asphalts which are suitable for technical purposes and those which are not, can be explained on the basis of their chemical composition. While very little is known about the actual composition of asphalt, the differences can be shown by separating the asphalt into various fractions by means of solvents. For convenience, these are roughly divided into oily constituents, resins and asphaltenes. The oily constituents, as the name implies, are oils that are highly viscous, essentially simple aliphatic hydrocarbons, which can be distilled without decomposition and are substantially soluble in all solvents for oil.

The petroleum resins or "resins" are more or less amorphous in nature and are composed of unsaturated and polycyclic hydrocarbons. These may be hard and brittle, or soft and tacky, depending upon the source and method of production of the asphalt. These resins are soluble, for the most part in normal benzene, and can be separated from the oily constituents by treating the benzine solution with an absorptive c'ay.

The asphaltenes compose that portion of the asphalt which is insoluble in normal benzine. They are generally considered as polymerization products of the resins. When relatively free from the other two constituents, resins and oily constituents, they are a powdery material, varying from brown to black in color, and do not show a softening point but decompose at higher temperatures.

It has been found that asphalts having different properties are made up of different proportions of each of these materials. In general, asphalts with a high asphaltene and a low resin content possess poor ductility while, on the other hand, high resin content produces high ductility. Through the mutual relationship of the asphaltenes, petroleum resins and oils, as well as from their nature, the high asphaltene content produces high softening point, the low resin content decreased ductility and the high oil content a low break-point, resulting in a great elasticity even at low temperatures.

An object of this invention is to prepare an asphalt of desired physical properties from all crude petroleum oils.

In the method of refining crude oil which makes use of light hydrocarbons, such as propane, butane, ethane, etc., either by themselves or in combination with each other and with or without the additional uses of a selective solvent, such as phenol, cresol, aniline, furfural, etc., it is possible to throw out each of the above constituents in turn from the crude in greater or less state of purity; e. g., when treating crude oil with propane, it is possible to vary the softening point of the asphalt from somewhat below 100° F. to 200° F. and above. The higher the softening point, the nearer is the approach to asphaltenes. In the same manner, it is possible to vary the purity of the resins. These variations are brought about in both cases by varying the composition of the solvent, the amount of solvent used and the temperature at which the separation takes place. Pressure also is changed with composition of the solvent and/or temperature of separation.

This, and other objects of the invention, will be clear'y understood by reference to the accompanying drawing, which illustrates diagrammatically and apparatus in which a preferred embodiment of the invention can be performed.

An oil for example, one volume of residual petroleum oil is passed through pipe 1 by means of pump 2, into a treating chamber 3. When liquid propane is used as the solvent, a temperature of about 120° F. and a pressure of about 200 pounds per square inch is maintained in the treating chamber. Other pressures and temperatures are used with other solvents, such as butane, ethane, etc. The residual oil may also be treated with other so'vents, such as phenol, cresol, aniline, furfural, etc., either alone or together with the liquid propane, butane, ethane, etc. Generally the oils that have been separated from the resins and asphaltenes are extracted with phenol, cresol etc. The extract is then separated and blended with the resins and asphaltenes. For illustration only, the description shall be limited to use of liquid propane alone.

Liquid propane is passed through pipes 4 and 5 by means of pump 6 into treating chamber 7. Five volumes of liquid propane are used for each volume of residual petroleum oil passed into the treating chamber 3. The liquid propane is first contacted with a fraction of the residual petroleum oil that is not soluble in liquid propane at a temperature of about 120° F. and at a pressure of about 200 pounds per square inch. This fraction of residual petroleum oil is passed by means of pump 8 through pipes 4 and 5 into treating chamber 7 from treating chamber 3. A temperature of 130° F. and a pressure of 220 pounds per square inch is maintained in treating chamber 7. A two-layer separation takes place in treating chamber 7. The lower layer consisting mainly of asphaltenes, is removed through pipe 10 provided with valve 11. The upper layer of liquid propane with a fraction of oil in solution passes through pipe 12 provided with valve 13 and pipe 2 into treating chamber 3.

A two-layer separation of asphaltenes and liquid propane with the remainder of the residual petroleum oil in solution takes place in treating chamber 3. The asphaltenes are removed as pointed out above, and washed with liquid propane at a higher temperature. If it is desired to obtain asphaltenes relatively free from resins, the asphaltenes may be subjected to further washes with liquid propane at higher temperatures, and also to the higher pressures required to keep the propane liquid. Other solvents, such as liquid butane, ethane, etc. may be used to treat the separated asphaltenes, but different temperatures and pressures are required depending on the solvent used.

The propane containing the oily constituents and resins in solution, is passed through pipe 14 by means of pump 15 into treating chamber 16. The temperature of the solution is raised to about 170° F. and the pressure to about 450 pounds per square inch. At this temperature and pressure, resins and the heavier oils settle out and the lighter oil remains in solution in the propane. The propane lighter oil solution is removed by means of pipe 17 provided with valve 18 to storage. The resins with the heavier oils, are removed through pipe 19 provided with a pressure relief valve 20 and pipe 21, to treating chamber 22. Into this treating chamber 22 is also passed two volumes of propane through pipe 23 provided with pump 24 and pipe 21. A temperature of about 150° F. together with the pressure required to keep the propane liquid, is maintained in this treating chamber 22. The resins settle out. The resins and propane with the heavier oil in solution are removed separately through pipe 25 provided with valve 26 and pipe 27 provided with valve 28 respectively. Steam heating coils 29 and cooling coils 30 are provided to regulate the temperature.

The asphaltenes separated by these means are fluxed with the resins and the oily constituents are then added to give the desired softening point, thus making it possible to procure asphalts of satisfactory quality for commercial uses from any source of asphaltic or semi-asphaltic crude.

The following examples show changes which may be brought about by modifying the percentages of each of these constituents.

|  | Softening point ° F. | Penetration 77°/100 g/5" | Penetration 32°/200 g/60" | Penetration 100°/100 g/5" | Ductility 60° F. |
|---|---|---|---|---|---|
| 38% asphaltenes<br>36.3% resins<br>25.7% oil | 119 | 75 | 22 | T. S. | 54 |
| 39.2% asphaltenes<br>24.5% resins<br>36.3% oil | 121 | 94 | 35 | T. S. | 14 |
| 46.7% asphaltenes<br>15.9% resins<br>37.4% oil | 123 | 78 | 32 | T. S. | 11½ |
| Experimental | 119 | 72 | 16 | 290 |  |
| Pipe still product | 121 | 65 | 15 | 250 |  |
| Vacuum reduced | 123 | 60 | 14 | 227 |  |

When a selective solvent is used for improving the V. I. characteristics of an oil, either during treatment with light hydrocarbon solvents or as a later step, the material extracted with the selective solvent may be used as a portion or all of the oily constituents in place of oily constituents which were originally present in the crude.

It is obvious that the component parts may be taken from various crudes, not necessarily from the same one; also that a complete asphalt from one crude can be improved by adding one or more components from another source.

Having thus described the invention, it is not intended that it be limited by any of the specific examples given but it is desired to claim all inherent novelty as broadly as the prior art permits.

We claim:

1. Method of manufacturing asphalts which comprises subjecting crude petroleum oils to distillation to separate the lower boiling fractions from asphaltic residual oils, separating the asphaltic residual oils by means of liquid solvents which are normally gaseous at normal pressures and temperatures into oils, resins and asphaltenes and incorporating 25.7 to 37.4% of the oils, 15.9 to 36.3% of the resins and 38 to 46.7% of the asphaltenes to produce asphalts.

2. Method of manufacturing asphalts which comprises subjecting a crude petroleum oil to distillation to separate the lower boiling fractions from asphaltic residual oils, separating the asphaltic residual oils by means of liquid solvents which are normally gaseous at normal temperatures and pressures into oils, resins and asphaltenes and incorporating 25.7% of the oils, 36.3% of the resins and 38% of the asphaltenes to produce asphalts.

3. Method of manufacturing asphalts which comprises subjecting a crude petroleum oil to distillation to separate the lower boiling fractions from asphaltic residual oils, separating the asphaltic residual oils by means of liquid solvents which are normally gaseous at normal temperatures and pressures into oils, resins and asphaltenes and incorporating 36.3% of the oils, 24.5% of the resins and 39.2% of the asphaltenes to produce asphalts.

4. Method of manufacturing asphalts which comprises subjecting a crude petroleum oil to distillation to separate the lower boiling fractions from asphaltic residual oils, separating the asphaltic residual oils by means of liquid solvents which are normally gaseous at normal temperatures and pressures into oils, resins and asphaltenes and incorporating 37.4% of the oils, 15.9% of the resins and 46.7% of the asphaltenes to produce asphalts.

5. Method of manufacturing asphalts which comprises subjecting crude petroleum oils to distillation to separate the lower boiling fractions from asphaltic residual oils, separating the asphaltic residual oils by means of liquid solvents which are normally gaseous at normal temperatures and pressures into oils, resins and asphaltenes, treating the separated oil with a selective solvent and incorporating 25.7% to 37.4% of the extract obtained from the separated oil, 15.9% to 36.3% of the resins and 38% to 46.7% of the asphaltenes to produce asphalts.

6. Method of manufacturing asphalts according to claim 5, in which the selective solvent used is phenol.

7. Method of manufacturing asphalts according to claim 5, in which the selective solvent is cresol.

8. Method of manufacturing asphalts according to claim 5, in which the selective solvent is furfural.

ALFRED A. WELLS.
JOHN O. COLLINS.